US012382881B2

(12) United States Patent
Wu et al.

(10) Patent No.: US 12,382,881 B2
(45) Date of Patent: Aug. 12, 2025

(54) PLANT CONTAINER ASSEMBLY

(71) Applicant: CHANGYANG Technology Ltd., Taichung (TW)

(72) Inventors: Yu-Tse Wu, Taichung (TW); Yao-Ming Yang, Taichung (TW)

(73) Assignee: CHANGYANG TECHNOLOGY LTD., Taichung (TW)

( * ) Notice: Subject to any disclaimer, the term of this patent is extended or adjusted under 35 U.S.C. 154(b) by 83 days.

(21) Appl. No.: 18/376,636

(22) Filed: Oct. 4, 2023

(65) Prior Publication Data
US 2024/0114847 A1 Apr. 11, 2024

(30) Foreign Application Priority Data

Oct. 7, 2022 (TW) .................................. 111138162

(51) Int. Cl.
*A01G 9/02* (2018.01)
(52) U.S. Cl.
CPC .................................. *A01G 9/022* (2013.01)
(58) Field of Classification Search
CPC ...... A01G 9/022; A01G 9/023; A01G 31/025; A01G 31/06; B65D 21/0212; B65D 21/0224; B65D 21/0228; B65D 21/0209
See application file for complete search history.

(56) References Cited

U.S. PATENT DOCUMENTS

| | | | | |
|---|---|---|---|---|
| 3,648,849 A | * | 3/1972 | Harris | B65D 21/0224 211/126.5 |
| 4,619,363 A | * | 10/1986 | Wolfseder | A45C 7/005 220/23.6 |
| 5,404,672 A | * | 4/1995 | Sanderson | A01G 9/023 D11/152 |
| 2012/0024739 A1 | * | 2/2012 | Fjelland | F16B 45/036 403/321 |

FOREIGN PATENT DOCUMENTS

DE 202017006676 U1 * 3/2018
TW M528588 U 9/2016

* cited by examiner

*Primary Examiner* — Joshua D Huson
*Assistant Examiner* — Alanna K Peterson
(74) *Attorney, Agent, or Firm* — Birch, Stewart, Kolasch & Birch, LLP

(57) ABSTRACT

A plant container assembly includes a first plant container, a second plant container, and at least one buckle. The first plant container has at least one first buckle part protruding from an outer wall surface of a container wall of the first plant container and located at a bottom section of the container wall of the first plant container. The second plant container has at least one second buckle part protruding from an outer wall surface of a container wall of the second plant container and located at a top section of the container wall of the second plant container. When the first plant container is stacked on top of the second plant container, the buckle could be engaged with both the first buckle part of the (Continued)

first plant container and the second buckle part of the second plant container, thereby enhancing the stacking strength of the plant containers.

4 Claims, 14 Drawing Sheets

PLANT CONTAINER ASSEMBLY

BACKGROUND OF THE INVENTION

Technical Field

The present invention relates generally to planting plants, and more particularly to a plant container assembly.

Description of Related Art

It is known that a plant substrate (such as a sponge or soil) is placed inside a plant container, wherein a plant is planted in the plant substrate. However, a structure of the existing plant container could only provide a single type or a single quantity of plants for planting, restricting the possibilities for diverse landscaping variations with the plants planted. Besides, the existing plant container is provided with drainage holes at a bottom part of the plant container, wherein the drainage holes are configured to prevent roots of plants from rotting as excessive water accumulates at the bottom part of the plant container; still, the water, which is drained from the drainage holes, could be lost, so that a plant grower needs to regularly water the plant containers one by one, which is time-consuming and causes water-waste. Some plant growers choose to place a water tray below the plant container to collect water drained from the drainage holes; however, the water collected by the water tray could not be absorbed by the plant substrate and is prone to attract mosquitos and other disease-carrying insects.

In order to resolve the problems of the existing plant containers, including providing a single type or a single quantity of plants for planting, draining the water directly from the drainage holes but failing to provide the water to the plants effectively, and watering the plants frequently, a patent has been developed as below.

A known plant container disclosed in Taiwan Utility Model Patent issued No. M528588, named "ROOT-SPRINKLING TYPE PLANT CONTAINER", includes a body and a plurality of accommodating sections, wherein the body has a bottom face, a side wall, a plurality of drainage units, an overflow unit, and a support unit; the plurality of accommodating sections are disposed on an outer side of the side wall and protrudes outward from the side wall. The overflow unit is disposed in a center of the bottom face and includes a plurality of ribs and an overflow hole; the plurality of the ribs respectively protrude above and below the bottom face; the support unit includes a connecting member and a plurality of engaging members; the connecting member is engaged with the ribs of the overflow unit through the plurality of engaging members. In this way, when a plurality of root-sprinkling type plant containers are stacked, the accommodating sections of the root-sprinkling type plant container at a lower level are ensured to be located directly below the drainage units of the root-sprinkling type plant container located at an upper level. However, the root-sprinkling type plant container still suffers from the disadvantages as below.

1. The support unit of each of the root-sprinkling type plant containers provides a positioning function to support the root-sprinkling type plant containers stacked. However, two root-sprinkling type plant containers stacked on top of each other rely only on each of the support units in the center of each of the bodies to establish a connection; a junction part of the two support units respectively located on the two root-sprinkling type plant containers stacked has a small contact area insufficient to be subjected to greater force to maintain sufficient stability of the plant containers stacked; as a result, when the stacked root-sprinkling type plant containers are subjected to excessive force (such as strong wind), the support unit of each of the root-sprinkling type plant containers is susceptible to violent shaking relative to the body of each of the root-sprinkling type plant containers, even causing each of the support units to be damaged.

2. In addition, after watering the root-sprinkling type plant container, the amount of water that is retained in the plant substrate and is absorbed is limited. Though the time that water is retained in the body of the root-sprinkling type plant container is extended with a design of an undulating bottom face of the root-sprinkling type plant container, roots of plants in varying growth states may not be able to reach the bottom face of the body of the root-sprinkling type plant container to absorb the water that is retained for the extended period of time.

3. In order to achieve the purpose of easily removing the plant located in the plurality of accommodating sections, a plurality of plant baskets are respectively used to be fixedly engaged against the plurality of accommodating sections to prevent the plant baskets from toppling over. However, after the plants planted have grown, the plant baskets need to be removed from the plurality of accommodating sections; as the roots and stems of the plants planted may climb around the plant baskets, the roots and stems of the plants planted could be torn or damaged while removing the plants planted from the plant baskets.

4. When two or more of the plant root-sprinkling type containers are stacked and one of the root-sprinkling type plant containers needs to be removed or cleaned, a user has to sequentially disengage the connections of the corresponding support units out of the root-sprinkling type plant containers located on the top to smoothly remove the root-sprinkling type plant container desired, which is inconvenient and time-consuming.

Therefore, the existing design of the plant container still has room for improvement.

BRIEF SUMMARY OF THE INVENTION

In view of the above, the primary objective of the present invention is to provide a plant container assembly, which could enhance the stacking strength of plant containers when two or more plant containers are stacked.

The present invention provides a plant container assembly including a first plant container, a second plant container, and at least one buckle. The first plant container has at least one first buckle part; the at least one first buckle part protrudes from an outer wall surface of a container wall of the first plant container and is located at a bottom section of the container wall of the first plant container. The second plant container has at least one second buckle part; the at least one second buckle part protrudes from an outer wall surface of a container wall of the second plant container and is located at a top section of the container wall of the second plant container. The at least one buckle is engaged with both the at least one first buckle part of the first plant container and the at least one second buckle part of the second plant container when the first plant container is stacked on top of the second plant container.

With the aforementioned design, when two or more plant containers are stacked and one of the plant containers needs to be removed or cleaned, the connections of the plant containers could be broken through the at least one buckle and the plant container desired could be smoothly removed; after the plant container desired has been removed, any two of the plant containers separated could be stacked and be fixedly engaged with each other through the at least one buckle.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
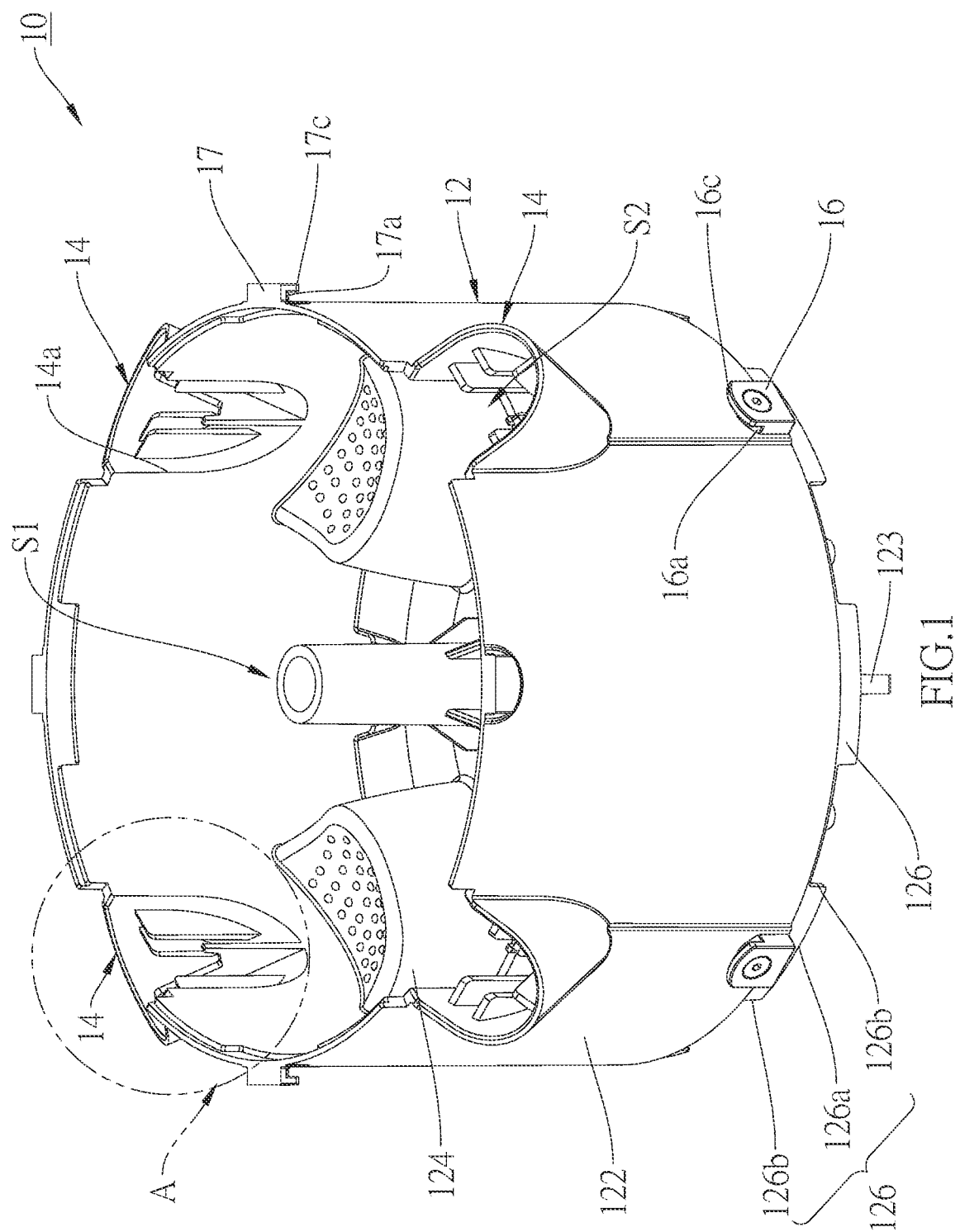
FIG. 1 is a perspective view of the plant container according to a first embodiment of the present invention.

A plant container 10 according to an embodiment of the present invention is shown in FIG. 1 to FIG. 4 and includes a main body 12 and at least one secondary body 14, wherein the main body 12 is constituted by a container bottom 121 and a container wall 122 surrounding around the container bottom 121 to form a container structure provided with an internal space S1; the at least one secondary body 14 is connected to a top section of the container wall 122 of the main body 12; the at least one secondary body 14 has a planting space S2 and a communicating opening 14a; the at least one secondary body 14 communicates the planting space S2 located in the at least one secondary body 14 with the internal space S1 located in the main body 12 through the communicating opening 14a. In the current embodiment, the number of the secondary body 14 is plural and the plurality of secondary bodies 14 are distributed on an outer wall surface of the container wall 122 of the main body 12; the plurality of secondary bodies 14 are provided at even intervals on the top section of the container wall 122; each of the plurality of secondary bodies 14 is formed by protruding outwards in a radial direction of the container wall 122 in an inclined manner. In the current embodiment, the plurality of secondary bodies 14 are integrally formed as a monolithic structure with the main body 12; however, in other embodiments, the plurality of secondary bodies could be an independent component and be connected to the container wall 122 of the main body 12 in an externally suspended manner.

Figure 3:
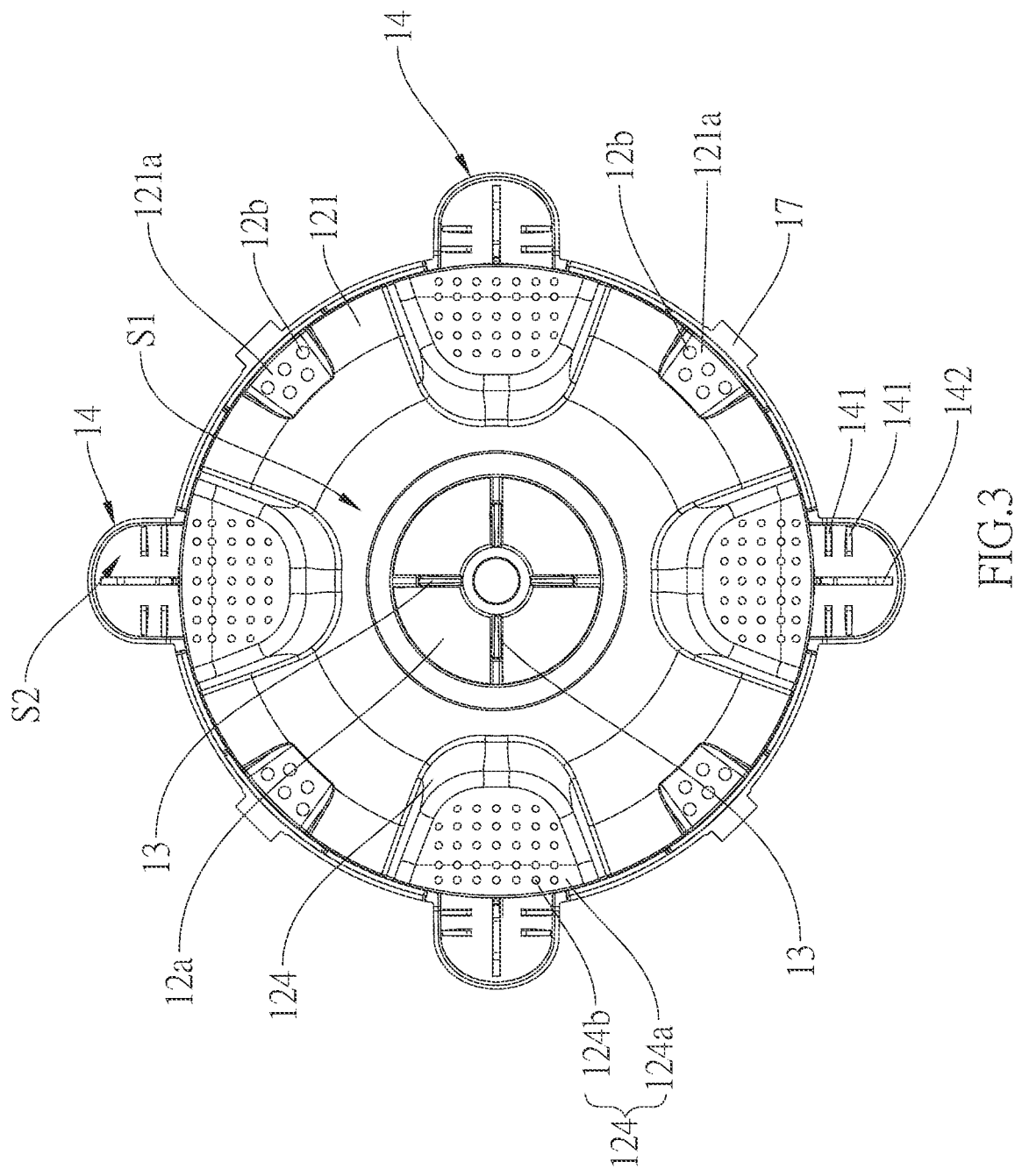
FIG. 3 is a top view of the plant container in FIG. 1.
Figure 4:
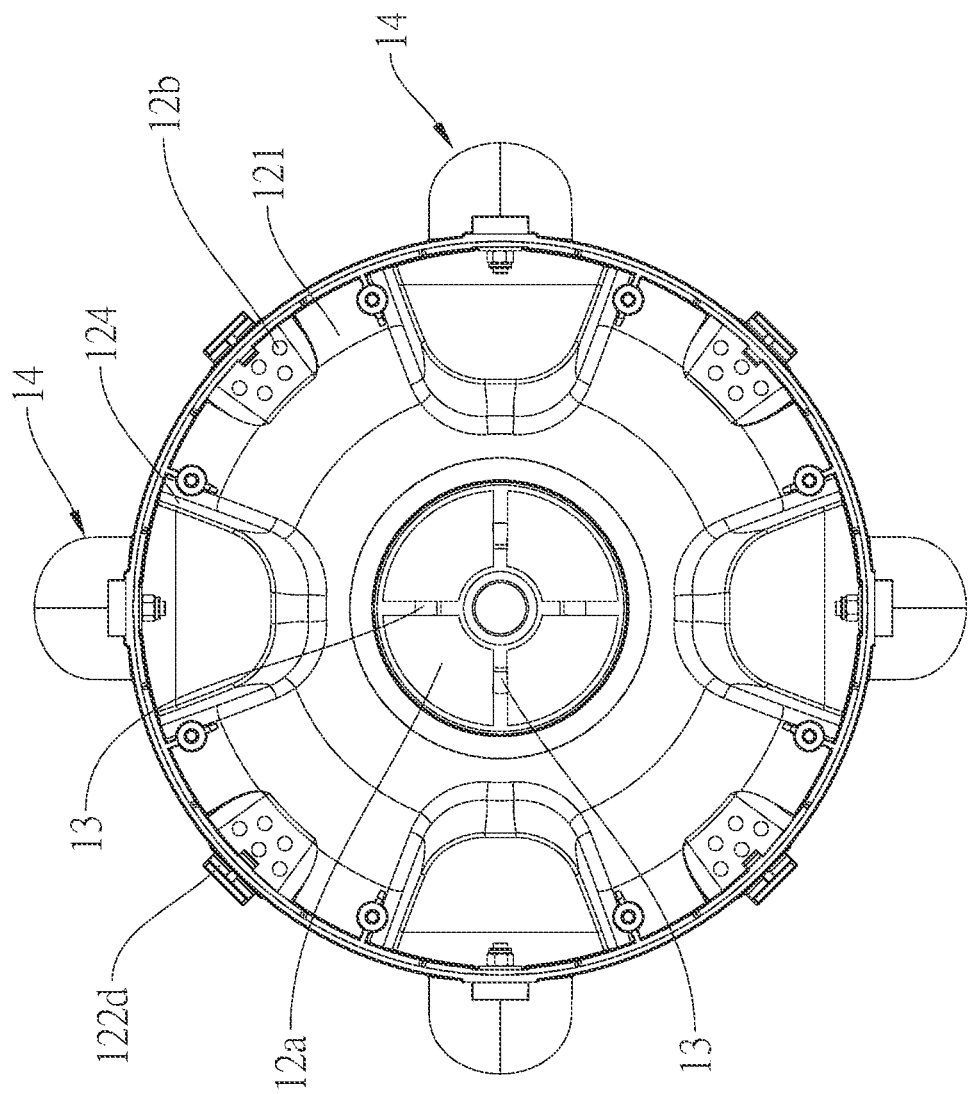
FIG. 4 is a bottom view of the plant container in FIG. 1.

In the current embodiment, the main body 12 has a drainage hole 12a located in the middle of the container bottom 121; a hollow tube 11 is vertically provided in the drainage hole 12a by connecting a plurality of rib plates 13 between an outer tube wall of the hollow tube 11 and a hole wall of the drainage hole 12a. Preferably, the container bottom 121 is inclined toward the drainage hole 12a, thereby facilitating centralized drainage of irrigation water to the drainage hole 12a. Furthermore, the container bottom 121 has at least one branched area 121a adjacent to the container wall 122, wherein the at least one branched area 121a could direct part of the irrigation water in the main body 12 to an outside of the container bottom 121. As shown in FIG. 3 and FIG. 4, in the current embodiment, the at least one branched area 121a includes a plurality of branched areas 121a, which are respectively located between two adjacent secondary bodies 14; each of the branched areas 121a has a plurality of holes 12b penetrating through the container bottom 121.

Figure 5:
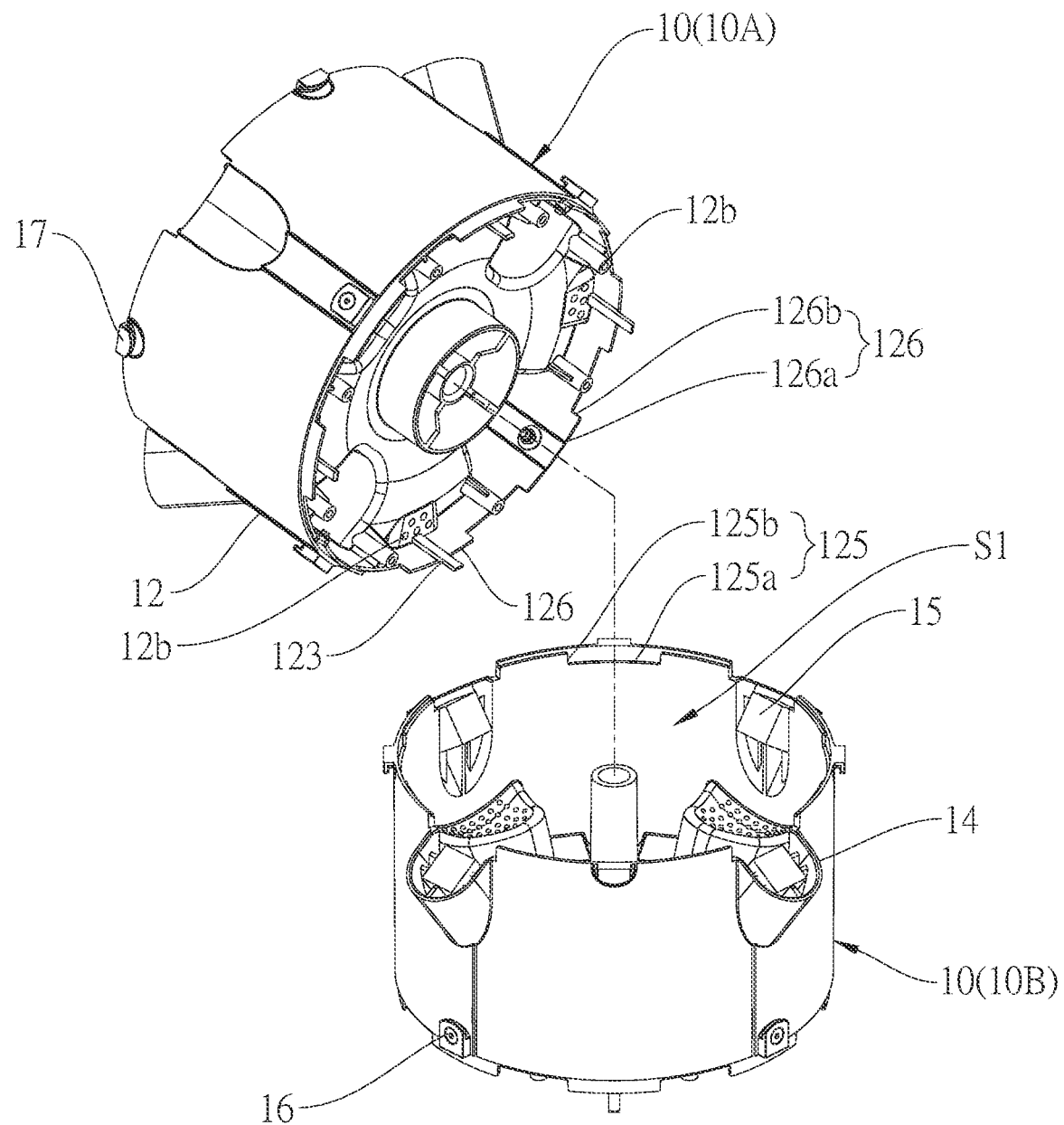
FIG. 5 is an exploded view of the two plant containers in FIG. 1 when the two plant containers are stacked.
Figure 6:
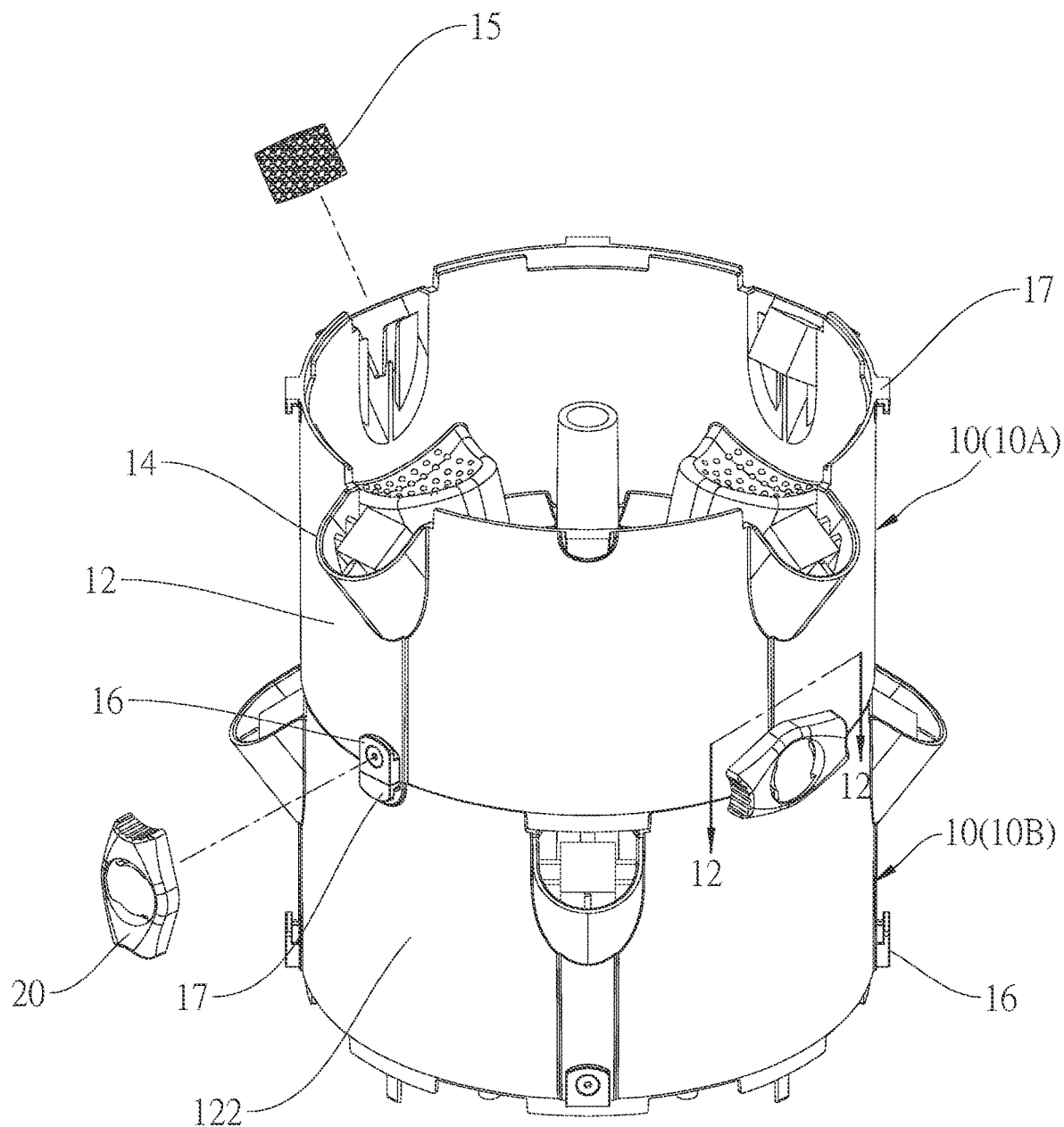
FIG. 6 is a partially exploded view of the two plant containers in FIG. 5 when the two plant containers are stacked.

Further referring to FIG. 5 and FIG. 6, in the current embodiment, the planting space S2 located in each of the plurality of secondary bodies 14 of the plant container 10 could be used to place a plant substrate, such as a sponge 15; a seed of a plant (not shown) could be pre-buried in the sponge 15; since each of the plurality of secondary bodies 14 is formed by protruding outwards in the radial direction of the container wall 122 in an inclined manner, when the irrigation water is poured into the sponge 15, part of the irrigation water flows into the internal space S1 of the main body 12 along an inner surface of the secondary body 14.

A structure of the plant container 10 of the present invention that the sponge 15 is allowed to be stably placed in the planting space S2 located in each of the plurality of secondary bodies 14 would be described as below, and a structure that could effectively utilize water resources would be explained. Besides, the plant containers 10 of the present invention could be stacked to increase the number of plants planted; a structure of the present invention that the plant containers 10 could be stably stacked would be described later.

Figure 7:
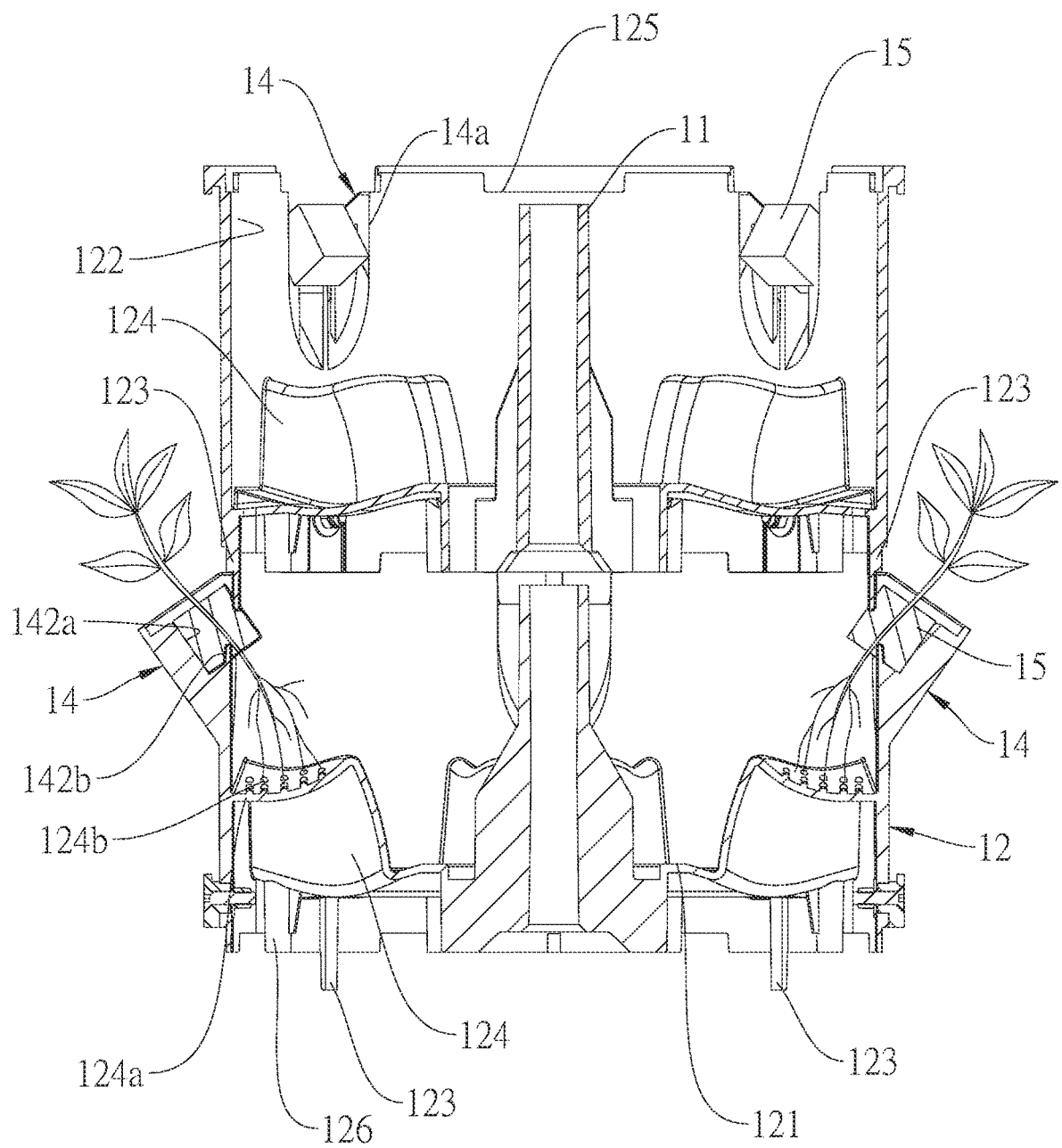
FIG. 7 is a sectional view of the two plant containers in FIG. 6 when the two plant containers are stacked.
Figure 8:
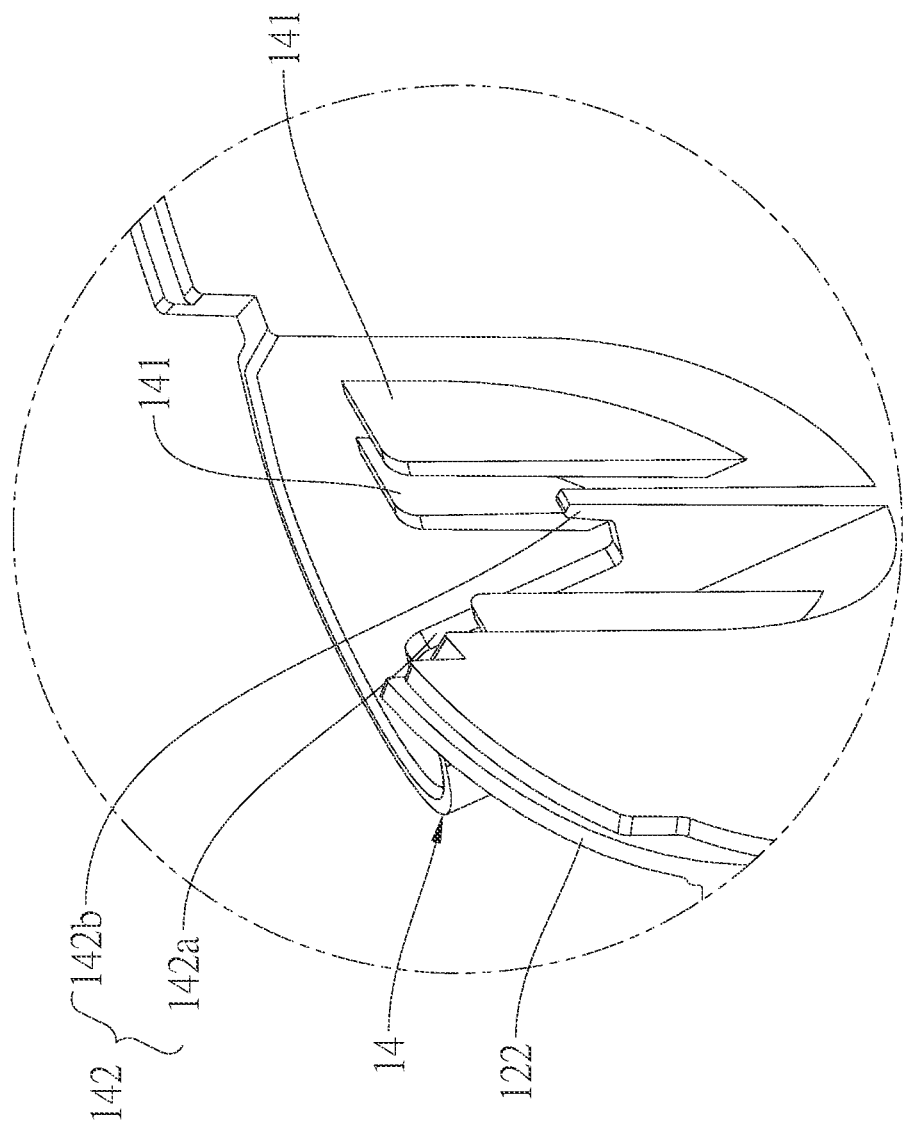
FIG. 8 is a partial enlarged view of a marked region A in FIG. 1.
Figure 9:
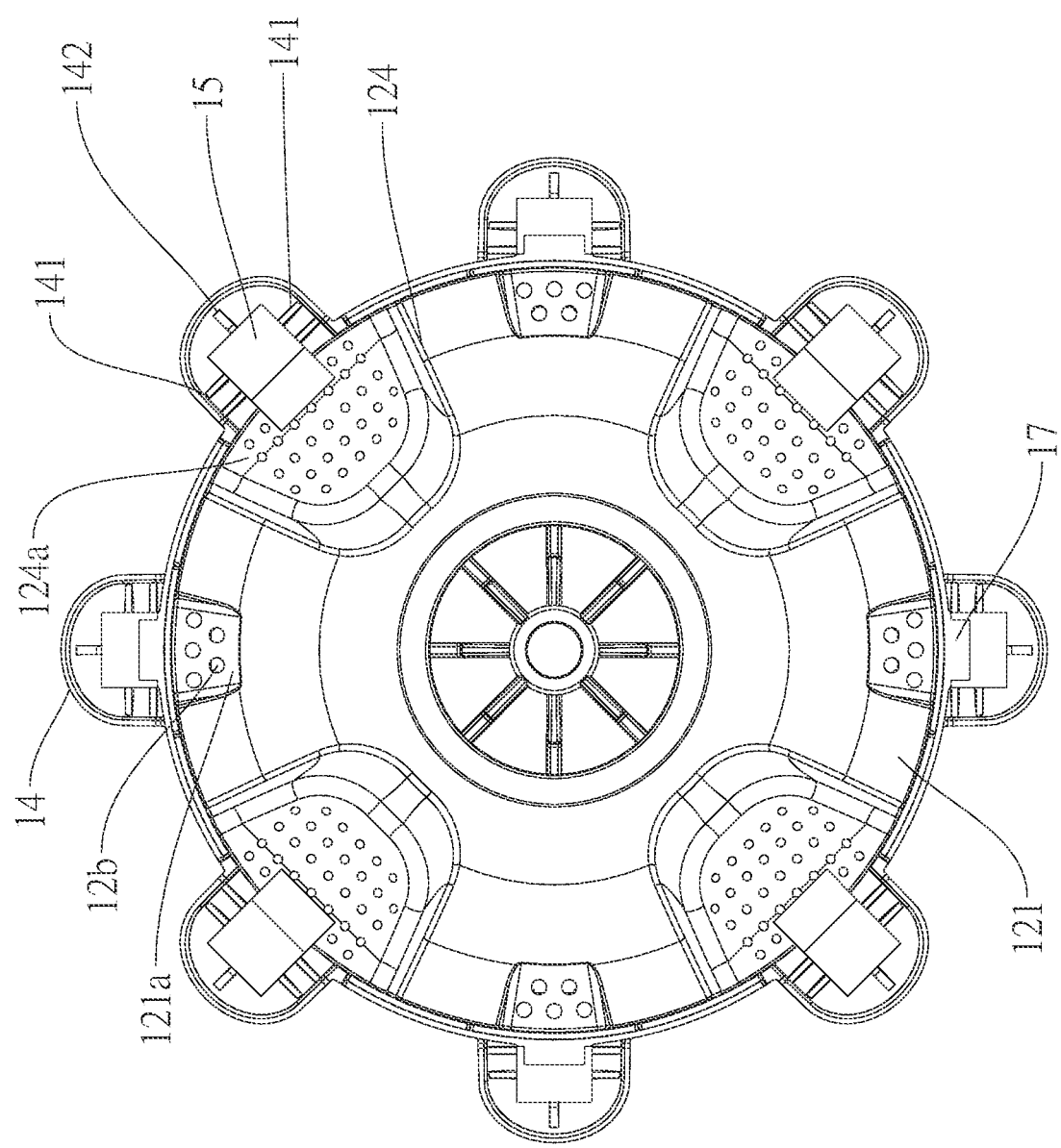
FIG. 9 is a top view of the two plant containers in FIG. 6 when the two plant containers are stacked.
Figure 10:
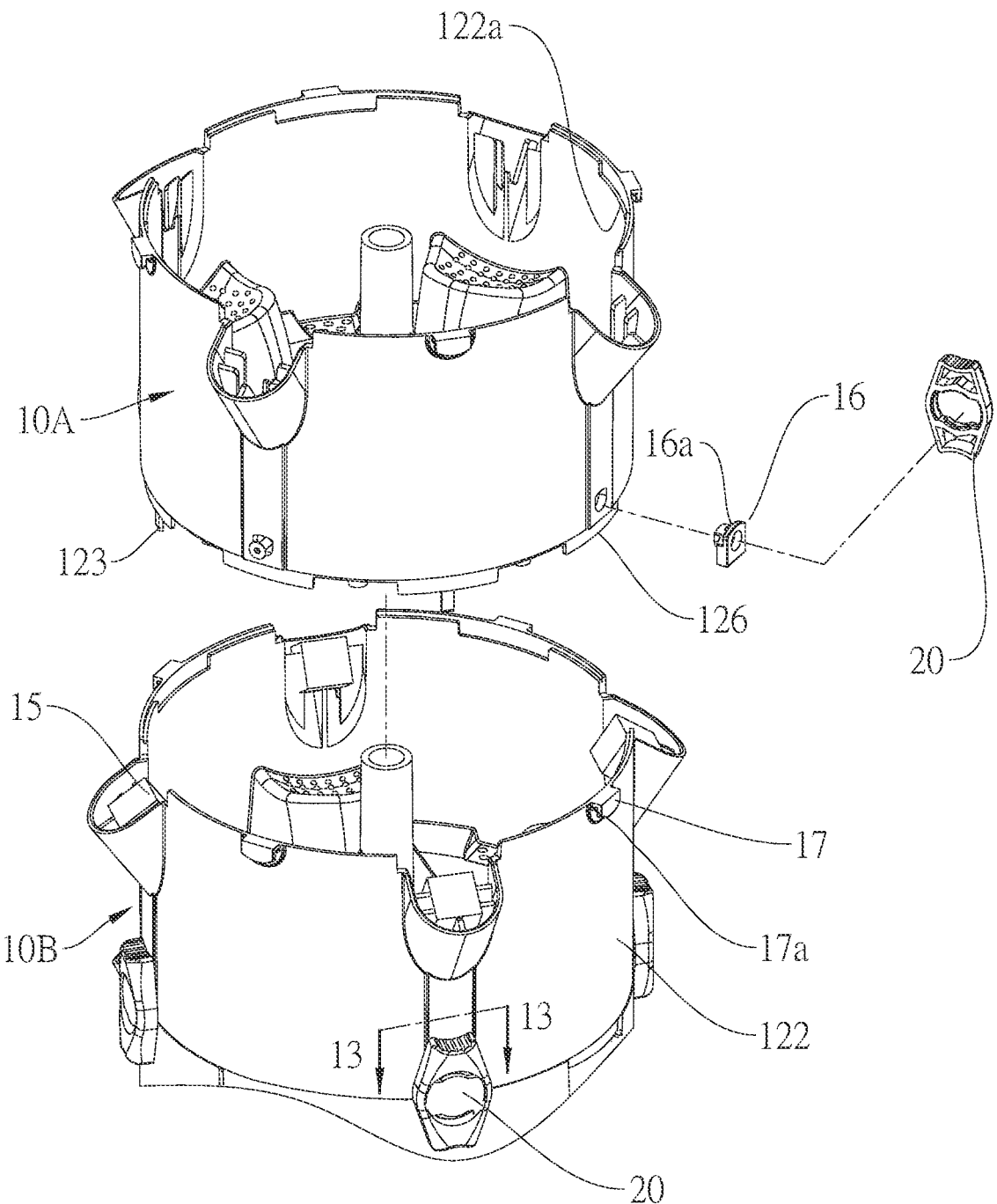
FIG. 10 is a partially exploded view of the two plant containers in FIG. 1 when the two plant containers are stacked.

First, in terms of stabilizing the sponge 15, the present invention provides a plurality of rib structures to confine the sponge 15. As shown in FIG. 5 to FIG. 9, each of the plurality of rib structures includes at least one protruding rib 123, at least one pair of rib strips 141, and a positioning rib 142; in order to illustrate easily, one of the plurality of rib structures, one of the sponges 15, and one of the secondary bodies 14 are used for illustration; the at least one protruding rib 123 is located at a bottom part of the main body 12 and extends downward; the at least one pair of rib strips 141 and the positioning rib 142 are located inside the secondary body 14 (shown in FIG. 8); the at least one pair of rib strips 141 are respectively connected to two opposite sides of an inner wall of the secondary body 14; the positioning rib 142 is located between the at least one pair of rib strips 141. The sponge 15 is deformable under pressure, so that when the sponge 15 is placed between the at least one pair of rib strips 141 and the positioning rib 142, the sponge 15 is confined in multiple directions to be unsusceptible to falling off. Additionally, in the current embodiment, the positioning rib 142 is further provided with an abutting part 142a and a hook part 142b; the abutting part 142a is connected to the inner surface of the secondary body 14 in an inclined manner; the hook part 142b is located at a lower section of the abutting part 142a; as shown in FIG. 7, a side surface of the sponge 15 abuts against the abutting part 142a, and a lower edge of the sponge 15 is hooked by the hook part 142b.

When the plant containers 10 are stacked on top of each other in the state shown in FIG. 5 to FIG. 7, the plant container 10 located at an upper level is defined as a first plant container 10A while the plant container 10 located at a lower level is defined as a second plant container 10B; the abovementioned first plant container 10A and the second plant container 10B stacked on top of each other constitute a plant container assembly defined in the present invention; the rib strips 141 and the at least one positioning rib 142 of the second plant container 10B would jointly clamp the sponge 15 from above and below with the at least one protruding rib 123 of the first plant container 10A, so that the sponge 15 could be placed more stably inside the secondary body 14 of the second plant container 10B. It should be noted that the number and the disposing locations of the protruding ribs 123 correspond to the number and the disposing locations of the secondary bodies 14. Additionally, in the current embodiment, the plurality of protruding ribs 123 are provided at intervals at the bottom part of the main body 12; when the plant containers 10 are separated and not stacked, a single plant container 10 could elevate the main body 12 through the plurality of protruding ribs 123, thereby preventing the bottom part of the plant container 10 from excessive moisture, which could be prone to attract mosquitos and other disease-carrying insects.

Figure 2:
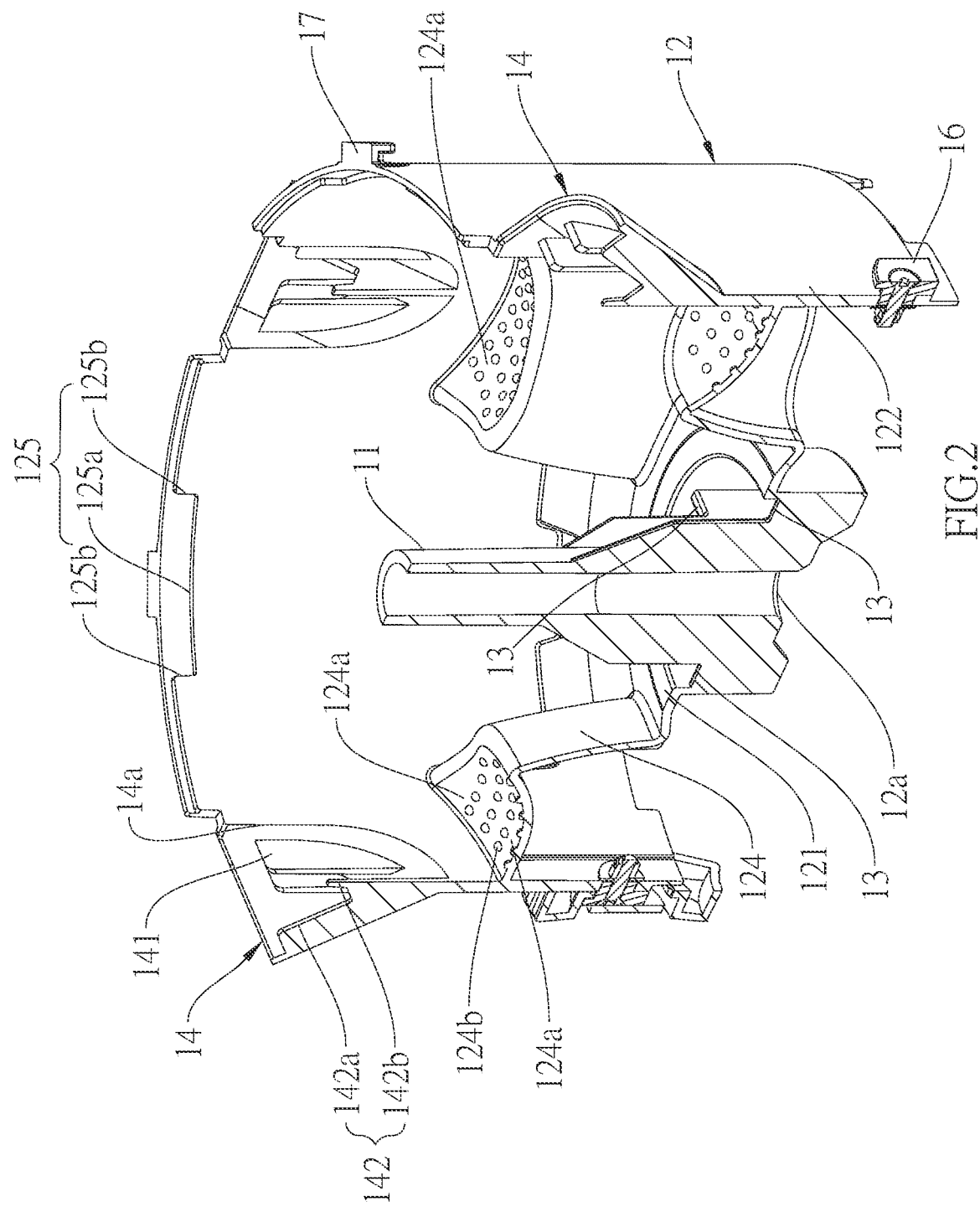
FIG. 2 is a schematic half-sectional view of the plant container in FIG. 1.

Referring to FIG. 2 and FIG. 7, in terms of effectively utilizing water resources, in the current embodiment, an inside of the main body 12 has at least one convex platform 124 raised from the container bottom 121; a top part of the at least one convex platform 124 is provided with a water-retained recess 124a, wherein an arc-shaped water-retained recess surface forms the water-retained recess 124a. In a vertical direction, the water-retained recess 124a is located between the container bottom 121 and the secondary body 14 and at a position directly below the communicating opening 14a. When the irrigation water is spilled from above the plant container 10 into an inside of the plant container 10, part of the irrigation water flows to the drainage hole 12a along container bottom 121 and then flows downward, thereby preventing the inside of the plant container 10 from accumulating excessive water; another part of the irrigation water drips from the holes 12b of each of the plurality of branched areas 121a of the container bottom 121 of the first plant container 10A and then is collected by the water-retained recess 124a of the second plant container 10B; a small amount of the irrigation water collected by the water-retained recess 124a could be absorbed by the roots of the plants when the plants are growing, so that the roots of the plants could be prevented from being rotten due to being improperly soaked in the excessive irrigation water.

Additionally, in the current embodiment, the water-retained recess 124a has a plurality of small arc convexes 124b protruding out of a surface of the water-retained recess 124a; the plurality of small arc convexes 124b are provided for the roots of the plants to climb to absorb the irrigation water retained in the water-retained recess 124a. It should be noted that the number of the at least one convex platform 124 could be plural; the number of the plurality of the convex platforms 124 corresponds to the number of the plurality of the secondary bodies 14; each of the plurality of convex platforms 124 is located at positions directly below the communicating opening 14a of each of the plurality of secondary bodies 14.

Referring to FIG. 1, FIG. 2, and FIG. 5 to FIG. 7, in the current embodiment, the structure, in which the plurality of plant containers 10 could be stably stacked on top of each other, is that at least one first positioning part and at least one second positioning part are integrally formed as a monolithic unit on the main body 12 of each of the plurality of plant containers 10; the first positioning part is located on a top part of the container wall 122 of the main body 12, and the first positioning part takes a positioning slot 125 as an example; the second positioning part is located on a bottom part of the container wall 122 of the main body 12, and the second positioning part takes a positioning convex rib 126 as an example; a shape of the first positioning part is complementary to a shape of the second positioning part. In the current embodiment, the number of the at least one first positioning part is four, and each of the first positioning parts is located between two adjacent secondary bodies 14 of the plurality of secondary bodies 14; the number of the at least one second positioning part is eight, and the second positioning parts are provided at intervals on the bottom part of the container wall 122, wherein four of the second positioning parts respectively correspond to one of the four first positioning parts while the other four of the second positioning parts respectively correspond to one of the four secondary bodies 14; each of the second positioning parts that corresponds to one of the secondary bodies 14 is further connected to one of the protruding ribs 123.

More specifically, as shown in FIG. 2, the first positioning parts are the positioning slots 125; each of the plurality of positioning slots 125 has a slot opening extending from an inner wall surface of the container wall 122 to a top edge of the container wall 122; each of the plurality of the positioning slots 125 has a slot bottom 125a and two slot walls 125b, wherein the two slot walls 125b are respectively connected to the slot bottom 125a. As shown in FIG. 1, the second positioning parts are the positioning convex ribs 126 that protrude; each of the plurality of positioning convex ribs 126 has a bottom edge 126a and two lateral edges 126b, wherein the two lateral edges 126b are respectively connected to the bottom edge 126a; contours of the bottom edge 126a and the two lateral edges 126b of the positioning convex rib 126 are complementary to shapes of the slot bottom 125a and the two slot walls 125b of the positioning slot 125. As shown in FIG. 5 and FIG. 6, when two plant containers 10 are stacked on top of each other, four of the positioning convex ribs 126 of the bottom part of the first plant container 10A are respectively inserted in one of the positioning slots 125 of the top edge of the second plant container 101B the two slot walls 125b of the positioning slot 125 of the second plant container 10B confine a range from which the positioning convex rib 126 of the first plant container 10A could move leftward and rightward; furthermore, the other four positioning convex ribs 126, which are respectively connected to one of the protruding ribs 123 of the first plant container 10A, on the bottom part of the first plant container 10A are respectively inserted in one of the secondary bodies 14 of the second plant container 10B; similarly, the two sides of the secondary body 14 of the second plant container 10B, which are connected to the main body 12 of the second plant container 10B, also confine the range from which the positioning convex rib 126 of the first plant container 10A could move leftward and rightward. In this way, when the plant containers 10 are stacked, an improper rotation could be prevented, so that the secondary bodies 14 of the first plant container 10A and the secondary bodies 14 of the second plant container 10B are arranged in a staggered manner, thereby providing a larger growing space for the plants. Meanwhile, the holes 12b of each of the branched areas 121a of the first plant container 10A are aligned with the secondary bodies 14 of the second plant container 10B in a vertical direction; in this way, during the irrigation, part of the irrigation water flowing into the first plant container 10A drips directly from the holes 12b of the branched areas 121a of the first plant container 10A to the secondary bodies 14 of the second plant container 10B and is absorbed by the sponge 15 in each of the secondary bodies 14 of the second plant container 10B.

Figure 11B:
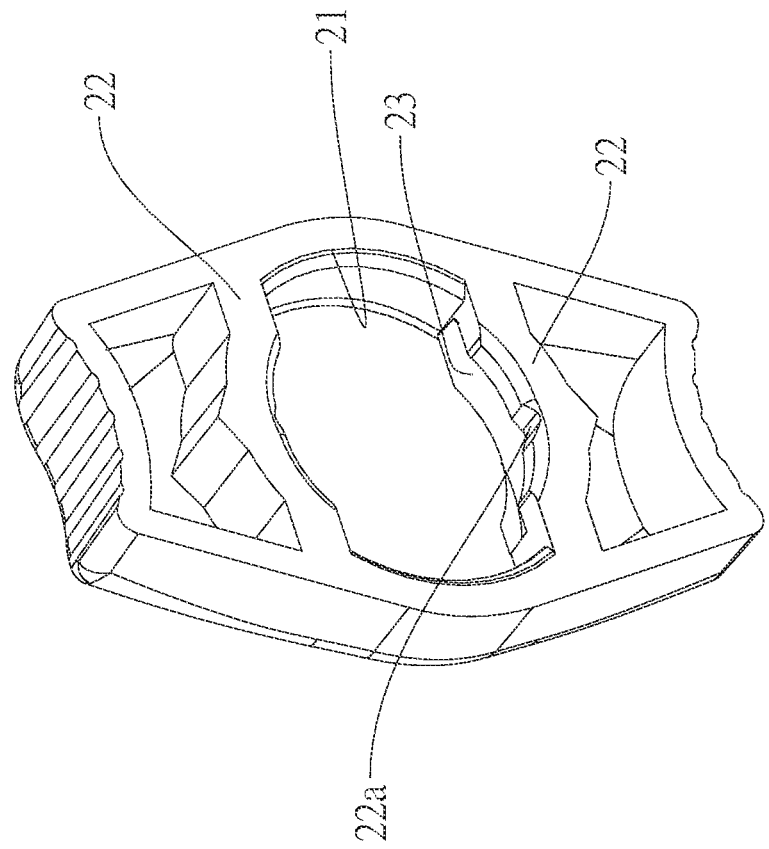
FIG. 11B is a perspective view of the buckle of the plant container in FIG. 6 seen from another perspective.
Figure 11A:
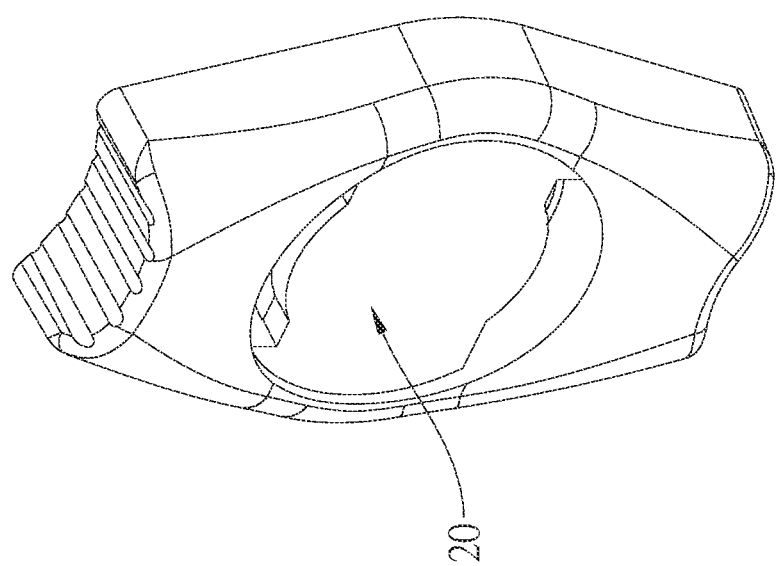
FIG. 11A is a perspective view of the buckle of the plant container in FIG. 6.
Figure 11C:
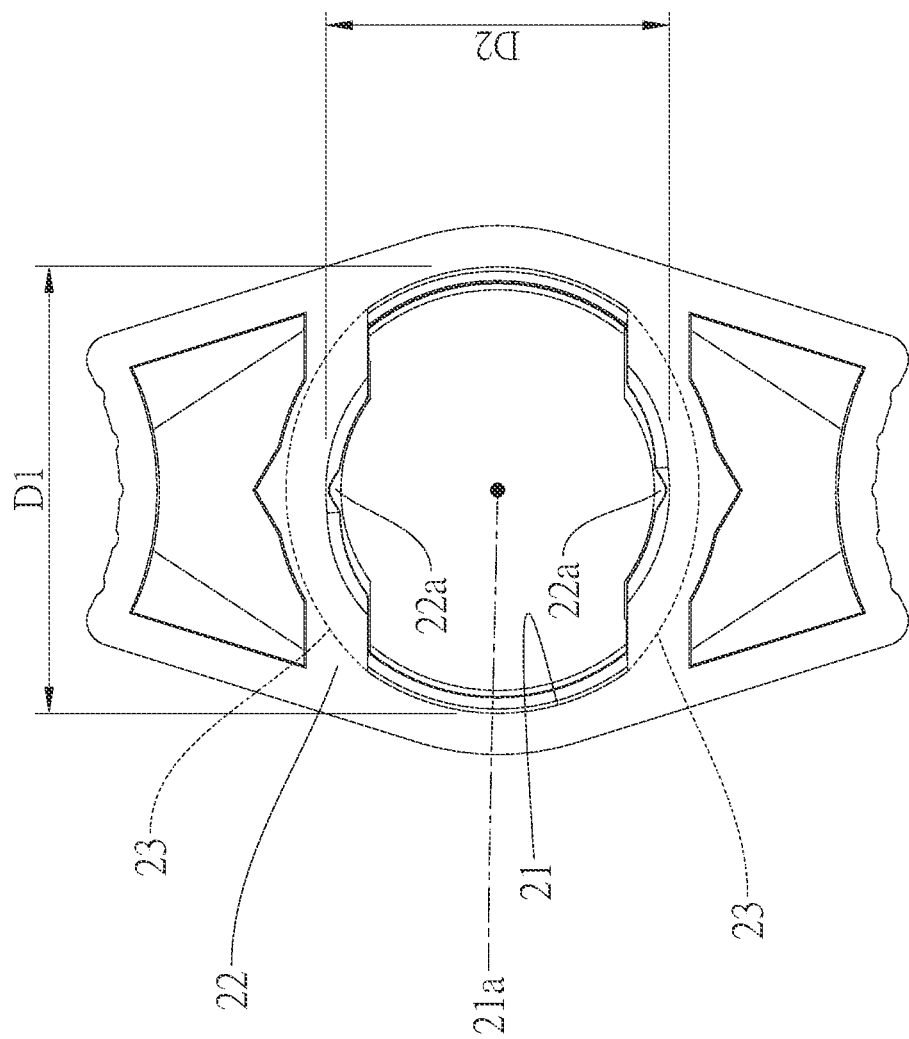
FIG. 11C is a front view of the buckle in FIG. 11B.

In terms of enhancing the stability of the plant containers 10 that are stacked on top of each other, the strengthened structure in the current embodiment includes at least one first buckle part 16 and at least one second buckle part 17, which are provided on each of the plant containers 10, and at least one buckle 20. Referring to FIG. 5, FIG. 6, FIG. 10 and FIG. 11A to FIG. 11C, in the current embodiment, each of the first plant container 10A and the second plant container 10B has a plurality of the second buckle parts 17. Each of the plurality of second buckle parts 17 protrudes from an outer wall surface of the container wall 122 of the main body 12 in the radial direction of the container wall 122 and is located at a top section of the container wall 122. Each of the first plant container 10A and the second plant container 10B has a plurality of the first buckle parts 16. Each of the plurality of first buckle parts 16 protrudes from the outer wall surface of the container wall 122 of the main body 12 in the radial direction of the container wall 122 and is located at a bottom section of the container wall 122. The plurality of the first buckle parts 16 and the plurality of the second buckle parts 17 of each of the plant containers 10 are arranged in a staggered manner in the vertical direction, wherein each of the first buckle parts 17 and each of the secondary bodies 14 of each of the plant containers 10 are located corresponding to each other in the vertical direction. In addition, the first buckle part 16 has an upper engaging slot 16a, wherein a slot opening of the upper engaging slot 16a faces upward, the second buckle part 17 has a lower engaging slot 17a, wherein a slot opening of the lower engaging slot 17a faces downward; the upper engaging slot 16a is provided with a positioning convex part 16b protruding from a slot surface of the upper engaging slot 16a; the lower engaging slot 17a is provided with a positioning convex part 17b protruding from a slot surface of the lower engaging slot 17a. The buckle 20 has a pair of flanges 22 on a back of the buckle 20; in an embodiment, the buckle 20 has an engaging hole 21 formed by recessing into a middle part of the back of the buckle 20; the buckle 20 has two grooves 23 formed by recessing into a hole wall of the engaging hole 21; the pair of flanges 22 are located closer to a center 21a of the engaging hole 21 than the two grooves 23, wherein the flanges 22 respectively protrudes from the hole wall of the engaging hole 21 and face each other; as shown in FIG. 11C, a maximum distance D2 between the flanges 22 is less than a hole diameter D1 of the engaging hole 21. A part of each of the flanges 22 recesses to form a positioning concave part 22a.

Figure 12:
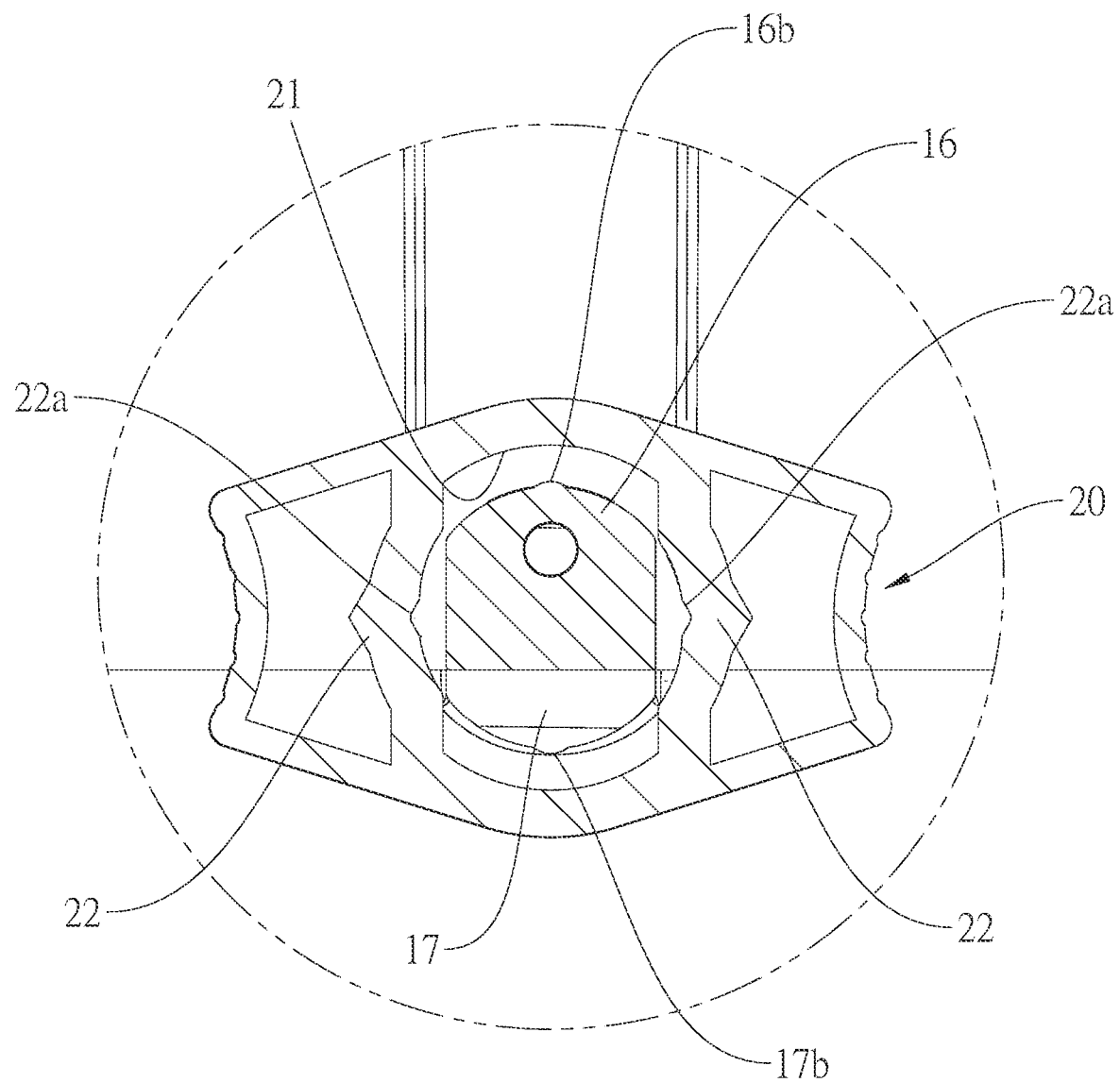
FIG. 12 is a sectional view of the buckle of the plant container along the 12-12 line in FIG. 6.
Figure 13:
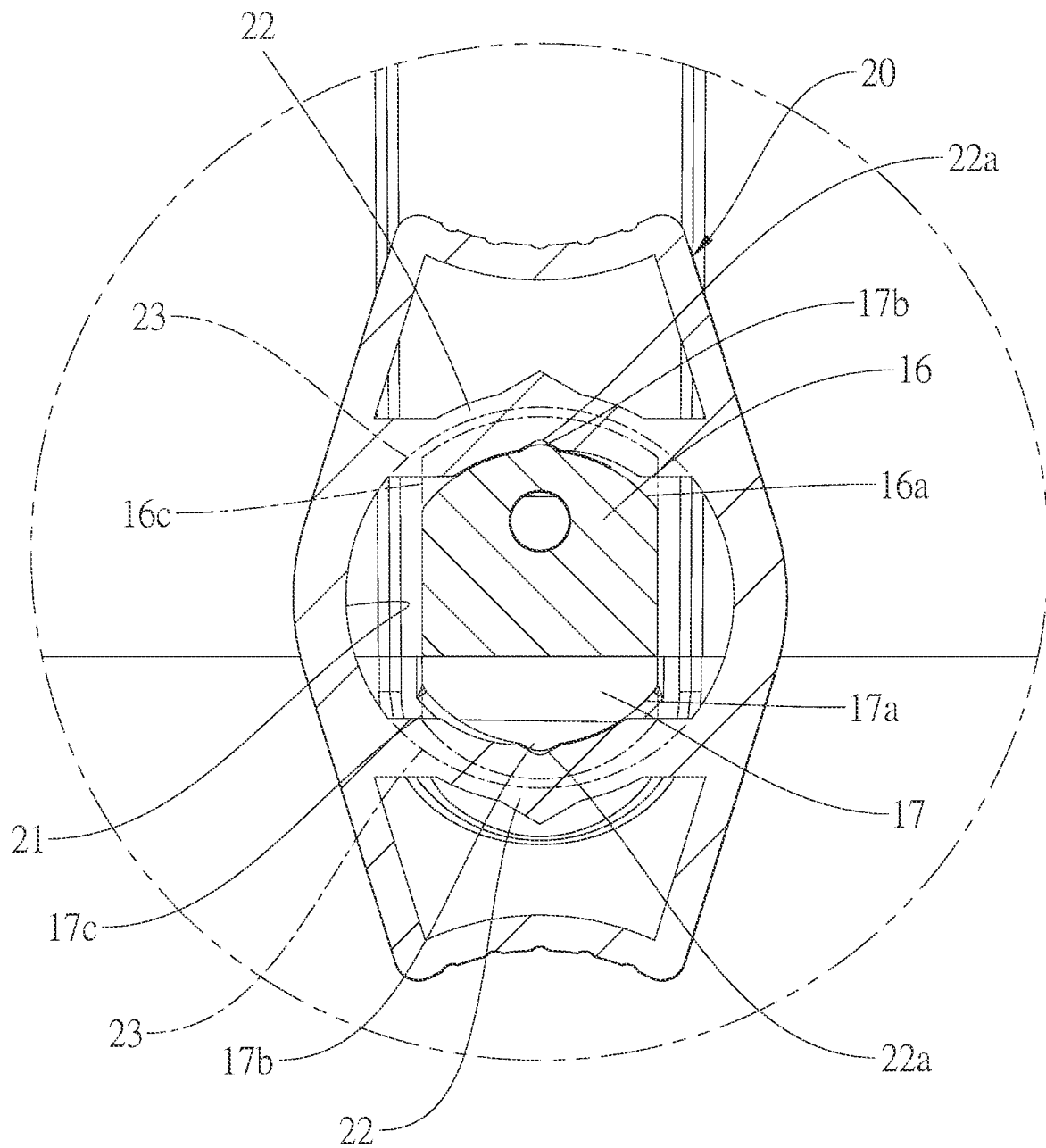
FIG. 13 is a sectional view of the buckle of the plant container along the 13-13 line in FIG. 10.

Referring to FIG. 6, the first plant container 10A and the second plant container 10B are stacked on top of each other; when the buckle 20 is engaged with the first buckle part 16 and the second buckle part 17, the buckle 20 is placed horizontally as shown in FIG. 12; at this point, the buckle 20 could be sleeved on the first buckle part 16 and the second buckle part 17 through a part of the engaging hole 21 with the hole diameter D1. Then, the buckle 20 is rotated to change to a vertical orientation as shown in FIG. 13; at this point, one of the flanges 22 of the buckle 20 is inserted in the upper engaging slot 16a, wherein a part 16c of the first buckle part 16 adjacent to the upper engaging slot 16a enters one of the two grooves 23; the other one of the flanges 22 of the buckle 20 is inserted in the lower engaging slot 17a, wherein a part 17c of the second buckle part 17 adjacent to the lower engaging slot 17a enters the other one of the two grooves 23; accordingly, the first plant container 10A and the second plant container 10B are stably engaged with each other. Besides, the positioning convex part 16b of the upper engaging slot 16a and the positioning convex part 17b of the lower engaging slot 17a respectively enter the two positioning concave parts 22a of the pair of flanges 22 to position the buckle 20, thereby preventing the buckle 20 from loosening.

It should be noted that the first buckle part 16 and the second buckle part 17 could be integrally formed on the outer wall surface of the container wall 122 of the plant container 10, or could be detachably engaged with the container wall 122 of the plant container 10. In the current embodiment, the first buckle part 16 is detachably engaged with the container wall 122 of the plant container 10 while the second buckle part 17 is integrally formed on the outer wall surface of the container wall 122 of the plant container 10.

To summarize, the plant container assembly of the present invention has the following advantages:

1. when the plurality of plant containers 10 are stacked on top of each other, the first positioning part of the main body 12 of the plant container 10 located at the upper level and the second positioning part of the main body 12 of the plant container 10 located at the lower level could be complementary to each other, so that the container wall 122 of the main body 12 of the plant container 10 located at the upper level and the container wall 122 of the main body 12 of the plant container 10 located at the lower level could be engaged with each other, thereby maintaining sufficient stability of the plant containers 10 stacked;
2. the water-retained recesses 124a inside the main body 12 are used to collect part of the excess irrigation water, thereby extending the time that the irrigation water is retained in the plant container 10 for the plants in varying growth states to absorb;
3. when the plurality of plant containers 10 are stacked on top of each other, the pair of rib strips 141 and the positioning rib 142 of each of the secondary bodies 14 of the plant container 10 located at the lower level and the plurality of the protruding ribs 123 of the main body 12 of the plant container 10 located at the upper level could jointly clamp one sponge 15 for planting plants, so that the sponge 15 is unsusceptible to move;
4. when the plurality of plant containers 10 are stacked on top of each other, the plurality of first buckle parts 16 of the main body 12 of the plant container 10 located at the upper level, the plurality of second buckle parts 17 of the main body 12 the plant container 10 located at the lower level and the plurality of buckles 20 could enhance the stacking strength of the plant containers 10 stacked;
5. since the first buckle parts 16 and the second buckle parts 17 of each of the plant containers 10 are arranged in a staggered manner in the vertical direction, and the first buckle part 16 and the secondary body 14 are located corresponding to each other in the vertical direction, when the plurality of plant containers 10 are stacked on top of each other, the secondary bodies 14 of the plant container 10 located at the upper level and the secondary bodies 14 of the plant container 10 located at the lower level are arranged in a staggered manner, thereby providing a larger growing space for the plants.

It must be pointed out that the embodiments described above are only some preferred embodiments of the present invention. All equivalent structures which employ the concepts disclosed in this specification and the appended claims should fall within the scope of the present invention.

What is claimed is:

1. A plant container assembly, comprising:
   a first plant container having at least one first buckle part; the at least one first buckle part protrudes from an outer wall surface of a container wall of the first plant container and is located at a bottom section of the container wall of the first plant container;
   a second plant container having at least one second buckle part; the at least one second buckle part protrudes from an outer wall surface of a container wall of the second plant container and is located at a top section of the container wall of the second plant container; and
   at least one buckle engaged with both the at least one first buckle part of the first plant container and the at least one second buckle part of the second plant container when the first plant container is stacked on top of the second plant container,
   wherein the at least one first buckle part of the first plant container has an upper engaging slot; a slot opening of the upper engaging slot faces upward; the at least one second buckle part of the second plant container has a lower engaging slot, wherein a slot opening of the lower engaging slot faces downward; the at least one buckle has a pair of flanges; when the at least one buckle is engaged with both the at least one first buckle part and the at least one second buckle part, one of the flanges is located in the upper engaging slot and the other flange is located in the lower engaging slot, and
   wherein the at least one buckle has an engaging hole; the flanges respectively protrude from a hole wall of the engaging hole and face each other; when the at least one buckle is engaged with both the at least one first buckle part and the at least one second buckle part, the at least one first buckle part and the at least one second buckle part are both located in the engaging hole.

2. The plant container assembly as claimed in claim 1, wherein the at least one buckle has two grooves respectively formed by recessing into the hole wall of the engaging hole; the flanges are located closer to a center of the engaging hole than the two grooves; when the at least one buckle is engaged with both the at least one first buckle part and the at least one second buckle part, a portion of the at least one first buckle part adjacent to the upper engaging slot enters one of the two grooves and a portion of the at least one second buckle part adjacent to the lower engaging slot enters the other one of the two grooves.

3. The plant container assembly as claimed in claim 2, wherein a maximum distance between the flanges is less than a hole diameter of the engaging hole.

4. The plant container assembly as claimed in claim 1, wherein the upper engaging slot has a positioning convex part; the lower engaging slot has a positioning convex part; each of the flanges has a positioning concave part; when the at least one buckle is engaged with both the at least one first buckle part and the at least one second buckle part, the positioning convex part of the upper engaging slot and the positioning convex part of the lower engaging slot respectively enter the two positioning concave parts of the flanges.

* * * * *